No. 763,062. PATENTED JUNE 21, 1904.
P. H. KOHLER.
JAR CLOSURE.
APPLICATION FILED OCT. 1, 1903.
NO MODEL.
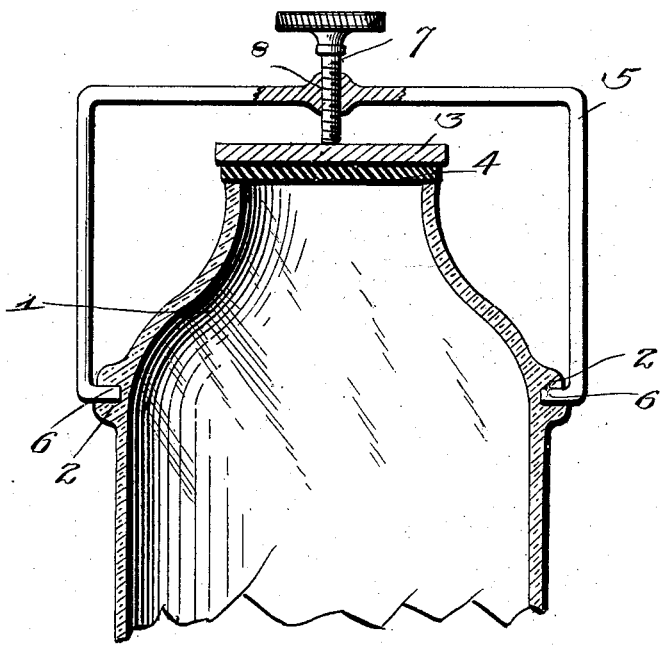
Inventor
Philip H. Kohler
By H. B. Willson
Attorney
Witnesses No. 763,062. Patented June 21, 1904.

UNITED STATES PATENT OFFICE.

PHILIP H. KOHLER, OF DENVER, COLORADO, ASSIGNOR OF ONE-HALF TO G. E. CRAWFORD, OF DENVER, COLORADO.

JAR-CLOSURE.

SPECIFICATION forming part of Letters Patent No. 763,062, dated June 21, 1904.

Application filed October 1, 1903. Serial No. 175,353. (No model.)

*To all whom it may concern:*

Be it known that I, PHILIP H. KOHLER, a citizen of the United States, residing at Denver, in the county of Denver and State of Colorado, have invented certain new and useful Improvements in Jar-Closures; and I do declare the following to be a full, clear, and exact description of the invention, such as will enable others skilled in the art to which it appertains to make and use the same.

The invention relates to jar-closures; and, as shown in the accompanying drawing, in which I have illustrated the invention in fragmentary section, it consists of a vessel 1, preferably of stoneware and formed with recessed lugs 2, forming bearings, the cover 3, placed upon an elastic gasket 4, the bail 5, having inturned ends 6, which are sprung into the recessed lugs to pivotally connect the bail to the jar, and the set-screw 7, which works through a threaded aperture 8, formed in the horizontal section of the bail and which with its lower end engages the cover 3 and forces the same and the elastic gasket firmly down upon the open end of the vessel, and thus securely clamps the cover in place.

What I claim is—

A jar provided with recessed lugs forming bearings, a cover for the jar, a spring-bail having inturned ends engaged with the recessed lugs, retained therein by the tension of the bail, and thereby pivotally connecting the latter to the jar, said bail having also a threaded opening, and a set-screw in said opening to bear on the cover, substantially as described.

In testimony whereof I have hereunto set my hand in presence of two subscribing witnesses.

PHILIP H. KOHLER.

Witnesses:
J. G. HAINLINE,
GEO. W. HOLMES.